US010405189B2

(12) United States Patent
Yankevich

(10) Patent No.: US 10,405,189 B2
(45) Date of Patent: Sep. 3, 2019

(54) SYSTEM AND METHOD FOR IDENTIFYING AN OFF-CHANNEL RADIO FREQUENCY SOURCE

(71) Applicant: Cisco Technology, Inc., San Jose, CA (US)

(72) Inventor: Evgeny Yankevich, Beachwood, OH (US)

(73) Assignee: Cisco Technology, Inc., San Jose, CA (US)

( * ) Notice: Subject to any disclaimer, the term of this patent is extended or adjusted under 35 U.S.C. 154(b) by 100 days.

(21) Appl. No.: 15/657,496

(22) Filed: Jul. 24, 2017

(65) Prior Publication Data
US 2019/0028899 A1    Jan. 24, 2019

(51) Int. Cl.
H04W 16/14    (2009.01)
H04W 24/08    (2009.01)
H04W 84/12    (2009.01)

(52) U.S. Cl.
CPC .......... H04W 16/14 (2013.01); H04W 24/08 (2013.01); H04W 84/12 (2013.01)

(58) Field of Classification Search
None
See application file for complete search history.

(56) References Cited

U.S. PATENT DOCUMENTS

| 3,657,654 | A | * | 4/1972 | Friberg | H03J 3/185 334/15 |
| 5,513,215 | A | * | 4/1996 | Marchetto | H04H 20/67 375/229 |
| 2004/0229650 | A1 | * | 11/2004 | Fitton | H04B 7/0811 455/561 |
| 2013/0237160 | A1 | * | 9/2013 | Hessel | H04L 27/0006 455/73 |
| 2014/0253361 | A1 | * | 9/2014 | Rezk | G01S 7/021 342/16 |
| 2016/0285611 | A1 | * | 9/2016 | Fischer | H04L 5/0062 |

* cited by examiner

Primary Examiner — Ayaz R Sheikh
Assistant Examiner — Tarell A Hampton
(74) Attorney, Agent, or Firm — Meunier Carlin & Curfman LLC

(57) ABSTRACT

In a shared radio frequency (RF) band, regulations or standards can stipulate that a device using an RF channel must vacate the RF channel if another device having priority to the channel is detected. It takes time, however, to move channels and this added time reduces the effective speed of the communication. In some cases, a received signal from the other device may be received on the channel when the other device is not, in fact, operating on the channel. These received signals can lead the device to move channels, thereby slowing communications unnecessarily. Accordingly, disclosed herein are a system and method for checking the characteristics of a received signal's spectrum to determine if the source of the received signal is on-channel or off-channel. This determination may be used to minimize the device from taking unnecessary interference avoidance measures, such as dynamic frequency selection.

18 Claims, 7 Drawing Sheets

SYSTEM AND METHOD FOR IDENTIFYING AN OFF-CHANNEL RADIO FREQUENCY SOURCE

TECHNICAL FIELD

The present disclosure relates to wireless communication and, more specifically, to identifying signals received on a channel as either (i) from a transmitter operating on the channel or (ii) from a transmitter operating on a different channel.

BACKGROUND

The radio frequency (RF) spectrum is a finite resource that has been divided into RF bands and further divided into channels to prevent interference. Despite these divisions, interference may still occur. Some RF bands, such as the Unlicensed National Information Infrastructure (i.e., UNII) band or the Industrial, Scientific, and Medical (i.e., ISM) band, are especially prone to interference because the channels in these bands are available to a variety of users/applications.

To prevent interference on a channel, a wireless device may monitor the channel prior to and during use and take an action (i.e., tune channels) to avoid interference when interference is detected. This interference avoidance process is known as "dynamic frequency selection" (i.e., DFS).

A problem with DFS arises when a transmitter (e.g., a radar), operating on a first channel, "leaks" signals/noise into a second channel used by another device (e.g., wireless access point). When this occurs, the device operating on the second channel may unnecessarily determine that the transmitter (i.e., source) is operating on the same channel and begin DFS to prevent interference. This is problematic because a DFS resulting from a false determination of interference can causes communication delays and can limit the number of channels that appear available to the device.

A need, therefore, exists for a system and method to identify received signals as either "on-channel" (i.e., signals from a source operating on the operating channel) or "off-channel" (i.e., signals from a source operating "off-channel"). In certain embodiments, the identification may be used to mitigate unnecessary DFS operations performed by a wireless network apparatus (e.g., wireless access point) that communicates in a wireless local area network (i.e., WLAN).

DETAILED DESCRIPTION

Figure 1:
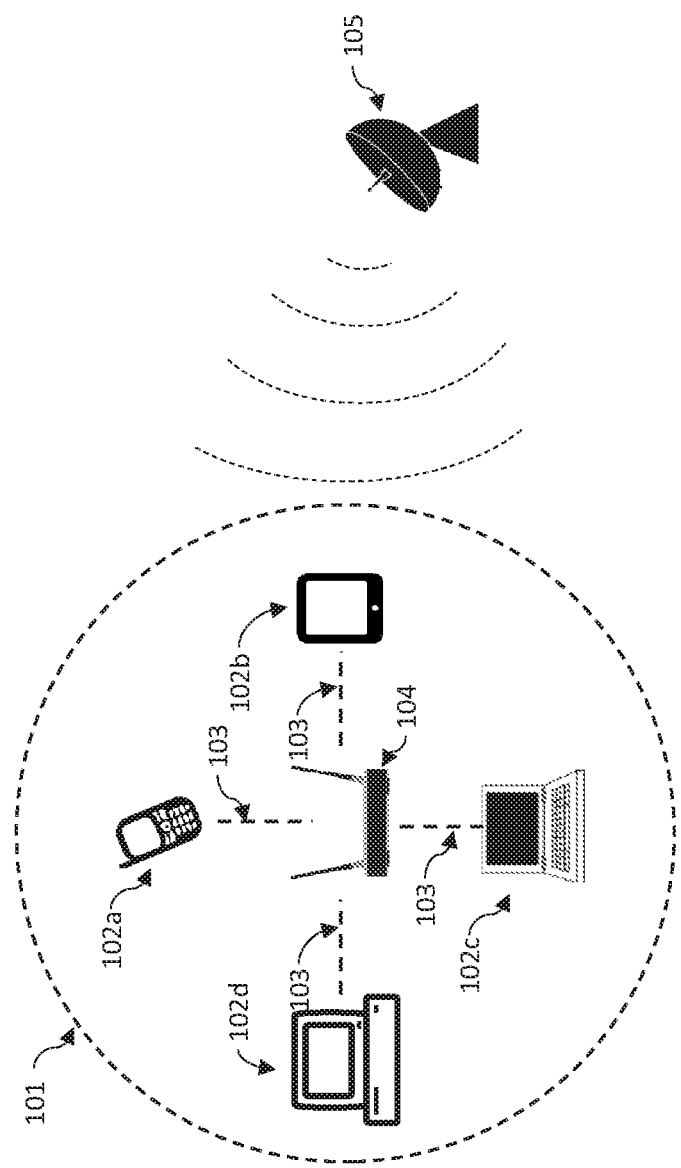
FIG. 1 graphically illustrates a shred wireless environment according to an embodiment of the present disclosure.

The present disclosure embraces a method for determining whether a received signal is from a source that is operating on a channel (i.e., on-channel) or is operating on a channel other than the channel (i.e., off-channel). The method begins by obtaining time-domain samples of a radio frequency (RF) signal that was received on a channel in an RF band, down converted to baseband, and demodulated. The time-domain samples are transformed into a spectrum that is centered at a zero frequency and that has a positive portion and a negative portion. Then, a first peak, at a first peak frequency, and a second peak, at a second peak frequency, are identified in the spectrum. The first peak frequency is located in either the positive portion or negative portion of the spectrum, while the second peak frequency is located in the portion of the spectrum not occupied by the first peak frequency. The first and second peak frequencies are symmetric about the zero frequency (e.g., +5 megahertz (MHz) and −5 MHz). After the first/second peaks are identified, a degree of asymmetry is computed for the spectrum based on the first peak and the second peak. Based on the degree of asymmetry, a source of the RF signal may be determined as operating either on-channel or off-channel.

The method described above may be embodied variously. For example, the present disclosure embraces a wireless local area network (WLAN) apparatus that includes an antenna tuned to a radio frequency (RF) band and a transceiver connected to the antenna that receives, down converts, demodulates, and digitizes an RF signal from a channel in the RF band. The WLAN apparatus further includes a processor communicatively coupled to the transceiver. The processor is configured by software instructions (e.g., stored in a memory) to perform the method described above. In another example, the present disclosure embraces a non-transitory computer readable medium that contains computer readable instructions, which when executed by a processor, cause the processor to perform the method described above.

In another possible embodiment of the method, the source of the RF signal is a radar. For example, the RF band may be shared by the WLAN apparatus and the radar. In this case, when a radar is determined to be operating on the same channel as the WLAN apparatus (i.e., on-channel), the WLAN may tune (or be triggered to tune) to a new channel (e.g., within the RF band or in a different RF band).

In another possible embodiment of the method, computing the degree of asymmetry may include (i) measuring a first amplitude (e.g., A1) of the first peak, (ii) measuring a second amplitude (e.g., A2) of the second peak, and (iii) computing the degree of asymmetry as the difference between the first amplitude and the second amplitude (e.g., |A1−A2|). In some embodiments, the degree of asymmetry may be compared with a threshold, and based on the comparison, the source of the signal may be determined as on-channel or off-channel. The threshold, in some cases, may in a range of 10 to 15 decibels (dB).

In another possible embodiment of the method, a determination that the source of the RF signal is on-channel may be followed by dynamic frequency selection (DFS).

In another possible embodiment of the method, the time-domain samples may be analyzed before they are transformed into a spectrum in order to obtain an estimated frequency. Then, the estimated frequency may be used as the first peak frequency in subsequent operations of the method.

In another possible embodiment of the method, the time-domain samples may be transformed into a spectrum by computing a discrete Fourier transform (DFT) of the time-domain samples.

In another possible embodiment of the method, the RF band is the unlicensed national information infrastructure (UNII) band.

In what follows, context and detail of the exemplary embodiments described above will be provided to illustrate examples of preferred and/or alternative embodiments. Those skilled in the art will appreciate that various adaptations and modifications of these examples can be configured without departing from the scope and spirit of the disclosure. Accordingly, it is to be understood that, these examples are not intended to limit the scope of the disclosure.

FIG. 1 graphically illustrates a wireless environment. In the wireless environment, a WLAN 101 may include a network WLAN apparatus 104 (e.g., a wireless access point, router, bridge, etc.) that manages the communication between client devices 102a-d. Client devices may include (but are not limited to) one or more of mobile phones 102a, tablet computers 102b, laptop computers 102c, and desktop computers 102d. The client devices communicate with the WLAN apparatus using wireless communication links 103. The wireless communication links 103 may use various wireless protocols (e.g., IEEE 802.11a, 802.11n, 802.11ac, etc.) to transmit/receive information. The wireless communication links may transmit/receive the information on a channel designated within an RF band. Exemplary RF bands may include the UNII band, which is in the 5-6 GHz range, or the industrial, scientific and medical (i.e., ISM) band, which is in the 2-3 GHz range. The RF band consists of a plurality of channels, which may or may not be designated for shared used. A particular channel is chosen by the WLAN apparatus for communication but the WLAN apparatus may change channels at any time (e.g., to avoid interference).

Figure 2A:
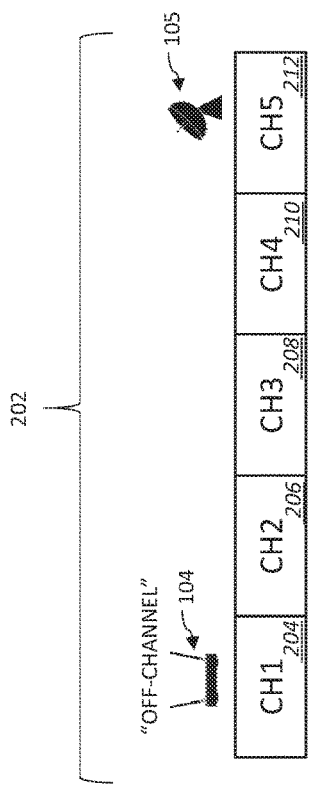
FIG. 2A graphically illustrates a shared RF band utilized by two systems operating on different channels according to an embodiment of the present disclosure.

FIG. 2A graphically illustrates an exemplary RF band 202 consisting of five channels 204, 206, 208, 210, 212. The RF band 202 is used by a WLAN apparatus 104 operating on a first channel (e.g., CH1 204) and a radar 105 operating on a second channel (e.g., CH5 212). From the perspective of the WLAN apparatus 104, the radar 105 (in FIG. 2A) is operating off-channel.

Figure 2B:
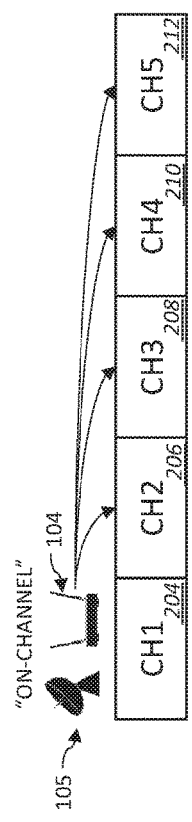
FIG. 2B graphically illustrates DFS according to an embodiment of the present disclosure.

According to regulations/standards for the UNII band, a WLAN apparatus 105 operating on a channel must move channels to avoid interfering with a radar 105. This interference avoidance results from a DFS process executed by the WLAN apparatus. FIG. 2B graphically illustrates the DFS process. As shown, when the WLAN apparatus 104 detects that the radar 105 is operating on the same channel (e.g., CH1 204) The WLAN apparatus 104 performs DFS to avoid interference. DFS may include temporarily halting communication with client devices 102a-d, searching for an open channel (e.g., by monitoring each channel for a period), transmitting instructions to the client devices 102a-d to move to the open channel (e.g., CH2 204, CH3, 206, CH4 210, or CH5 212), tuning to the open channel, and reestablishing communications with the client devices 102a-d on the open channel.

Figure 2C:
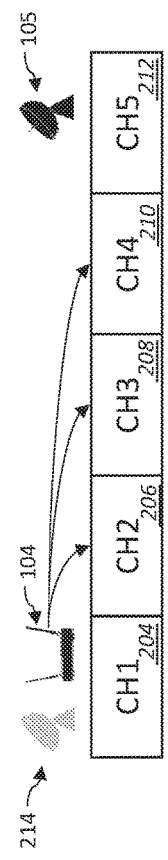
FIG. 2C graphically illustrates false DFS according to an embodiment of the present disclosure.

In some circumstances, however, the WLAN apparatus 104 may incorrectly detect an on-channel radar. FIG. 2C graphically illustrates an example of this circumstance (i.e., false DFS). As shown, a signal 214 from an off-channel radar 105, may be received by the WLAN apparatus on the WLAN's operating (i.e., service) channel (e.g., CH1 204). Without an ability to determine the origin of this signal 214, the WLAN apparatus may be falsely triggered to perform DFS. The false DFS interrupts communications, and to make matters worse, the number of available channels to which the WLAN apparatus can move is reduced because the radar 105 and its "image" (i.e., "ghost") effectively occupy two channels (e.g., CH1 204 and CH5 212).

The false signals from an off-channel radar (or radar-like signal) may result from a variety of conditions. Radars, which transmit at very high powers (e.g., 250 KW-1 MW), for example, may leak interference signals (e.g., spectral tails) into other channels. FIG. 3A is a graph of a frequency-domain spectrum of an off-channel radar signal after down conversion. The graph indicates the service channel 310 of the WLAN device (e.g., +/−10 MHz) to provide a perspective of how leakage signals may be received. FIG. 3A shows a portion of the "tail" of the radar spectrum being intercepted by the service channel. The service channel bandwidth of −10 MHz to +10 MHz is chosen as an example; other channel bandwidths may be used and are within the scope of the present disclosure.

Figure 3C:
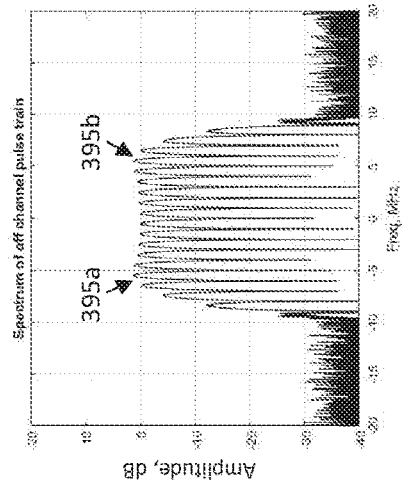
FIG. 3C is a second representative spectrum of a leakage signal from an off-channel source that may not require DFS according to an embodiment of the present disclosure.
Figure 3B:
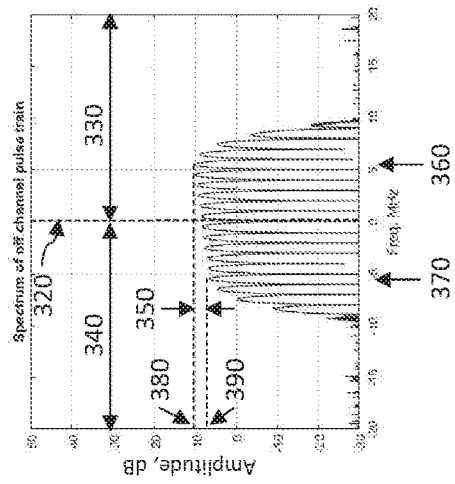
FIG. 3B is a first representative spectrum of a leakage signal from an off-channel source that may not require DFS according to an embodiment of the present disclosure.
Figure 3A:
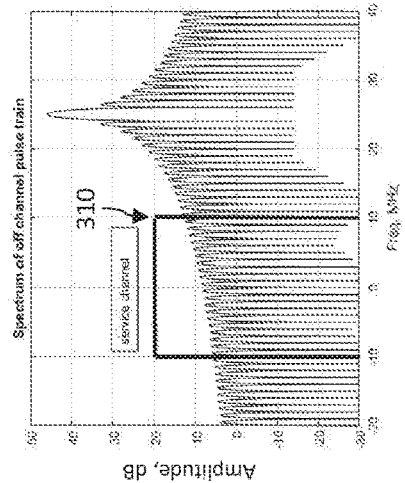
FIG. 3A graphical illustrates a spectrum from an off-channel source in relation to a service channel according to an embodiment of the present disclosure.

FIGS. 3B and 3C are spectra representative of exemplary signals from off-channel sources, which during reception have had their spectral tails folded into the service channel. Tail lobes 395a-b may be observed in FIG. 3C. The size of the tail lobes may depend on the pulse width of the radar signal and the transformation from time-domain to spectrum (e.g., the length of a discrete Fourier transform).

The spectra shown in FIGS. 3A-C were obtained by transforming a down converted (i.e., mixed to baseband), demodulated (e.g., I/Q demodulation), and digitized (e.g., using an A/D converter) time-domain signal into frequency domain. The transformation may be accomplished using a discrete Fourier transform (DFT), which can be computed using the fast Fourier transform (FFT). Accordingly, the spectrum may consist of bins that correspond to particular frequencies.

As shown in FIG. 3B, the spectrum spans the service channel (e.g., +/−10 MHz) and is centered at a zero frequency 320. Accordingly, the spectrum has a positive portion 330 and a negative portion 340. As may be observed from FIGS. 3B and 3C, the spectra resulting from a spectral tail of an off-channel radar signal (e.g., pulse train) are substantially symmetric about the zero frequency 320. A degree of asymmetry may quantify this characteristic.

To compute the degree of asymmetry, a first peak is found at a first peak frequency 360 in either the positive portion/negative portion of the spectrum and a first amplitude 380 is measured. In some cases, finding the first peak is accomplished by searching the positive and/or negative portions for a largest FFT bin (i.e., highest peak). In other cases, finding the first peak may be accomplished by estimating the frequency of a time-domain version of the radar signal before it is transformed. In these cases, a first peak may then be identified in the FFT spectrum as the FFT bin corresponding to the estimated frequency or may be identified as largest FFT bin within a range of the estimated frequency.

Various operations (e.g., filtering, smoothing, envelope detection, etc.) may be applied to the spectrum to aid in locating the first peak. The first peak may be identified using a variety of methods, including (but not limited to) local maximum or $1^{st}/2^{nd}$ derivative. In some cases, various mathematical operations (e.g., root, square, logarithm, etc.) may be applied to the bin value a part of measuring a first amplitude.

A second peak frequency 370 may be obtained as simply the inverse sign (i.e., inverse) of the first peak frequency 360. For example, if +5 MHz is the first peak frequency 360 located in the positive portion 330 of the spectrum then −5 MHz (located in the negative portion 340 of the spectrum) may be identified as the second peak frequency 370. In other embodiments, a second peak frequency may be obtained as a frequency corresponding to a peak in the spectrum located within a range of frequencies immediately surrounding the inverse of the first peak frequency. For example, if a first peak frequency is located at +5 MHz, then a second peak frequency may be identified as a highest peak (i.e., largest bin) in a range of −5.5 MHz to −4.5 MHz.

A degree of asymmetry 350 for the spectrum may be computed as a value corresponding to the difference between the first amplitude 380 and the second amplitudes 390. For example, the magnitude of the difference (i.e., |A1−A2|) may be used. Each of the exemplary off-channel spectra shown in FIGS. 3B and 3C, have a low degree (e.g., <10 dB) of asymmetry because they are substantially symmetric about the zero frequency 320.

Besides interference embodied as an intercepted/folded spectral tail of a radar, interference signals may result from a main lobe of an off-channel radar that is folded (i.e., mixed) into the service channel.

Figure 4B:
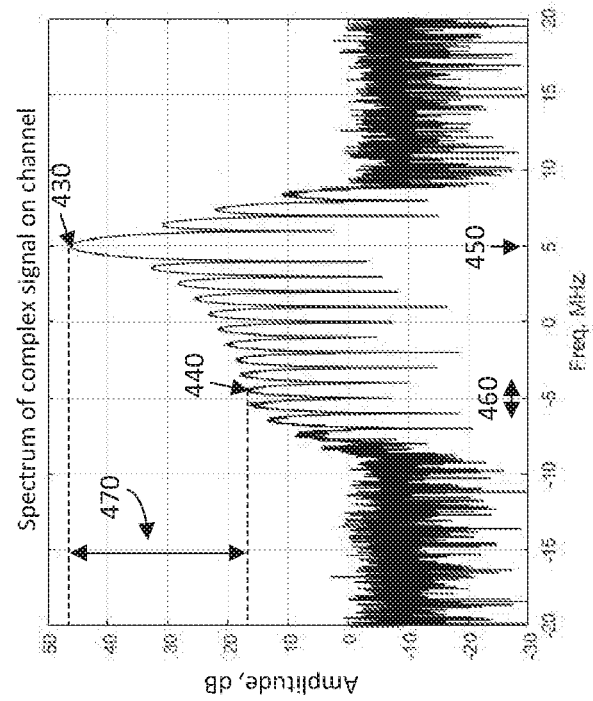
FIG. 4B is a representative spectrum of a signal from an on-channel source that may require DFS according to an embodiment of the present disclosure.
Figure 4A:
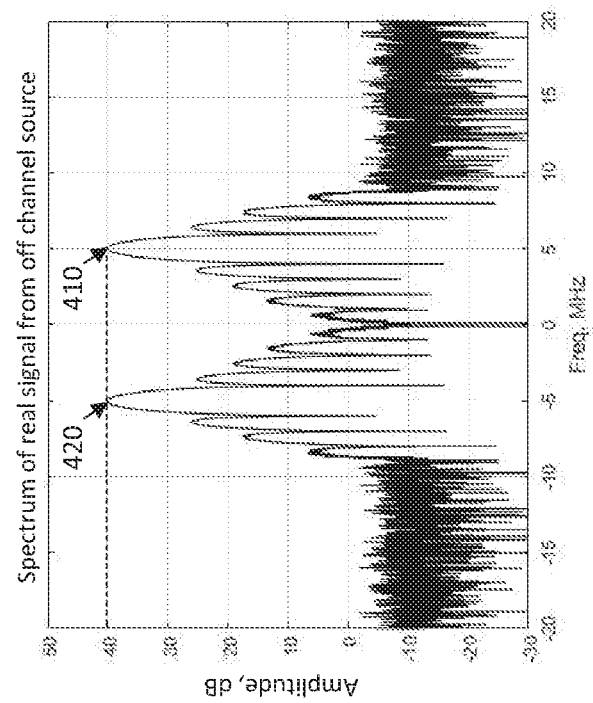
FIG. 4A is a representative spectrum of a signal from an off-channel source that may not require DFS according to an embodiment of the present disclosure.

FIG. 4A illustrates an exemplary spectrum of a received signal from a source operating off channel, which has had its main lobe folded into the service channel. While the peaks of a source operating off channel may appear anywhere within the service channel, the exemplary spectrum contains a first peak 410 at +5 MHz and a second peak 420 at −5 MHz. Like other interference signals that falsely trigger DFS (see FIGS. 3A, 3B, and 3C), the exemplary spectrum shown in FIG. 4A has a low degree of asymmetry (i.e., a zero degree of asymmetry because +/−5 MHz have equal amplitudes).

FIG. 4B graphically illustrates an exemplary spectrum of a received signal form a source operating on channel. In this case, only a single lobe is present in the service channel. FIG. 4B illustrates an exemplary spectrum of a on channel signal with a first peak 430 at a first peak frequency 450 (i.e., +5 MHz) and a second "peak" 440 at a second peak frequency 440 which is a peak found in a range 460 of frequencies around the inverse of the first peak frequency (i.e., ~−5 MHz). Unlike the signals that can falsely trigger DFS (see FIGS. 3A-C and 4A), the on-channel spectrum shown in FIG. 4B has a high degree of asymmetry 470 (i.e., >20 dB). It should be noted that while shown at +5 MHz, the peak of the source operating on channel could be located anywhere within the service channel.

The fact the received signals from an OFF-channel source have a low degree of asymmetry while received signals from an on-channel source have a high degree of asymmetry, implies that the degree of asymmetry of a received spectrum can be used to determine whether the source of the signal was operating on-channel or off-channel. This determination helps to prevent unnecessary DFS operations.

Figure 5:
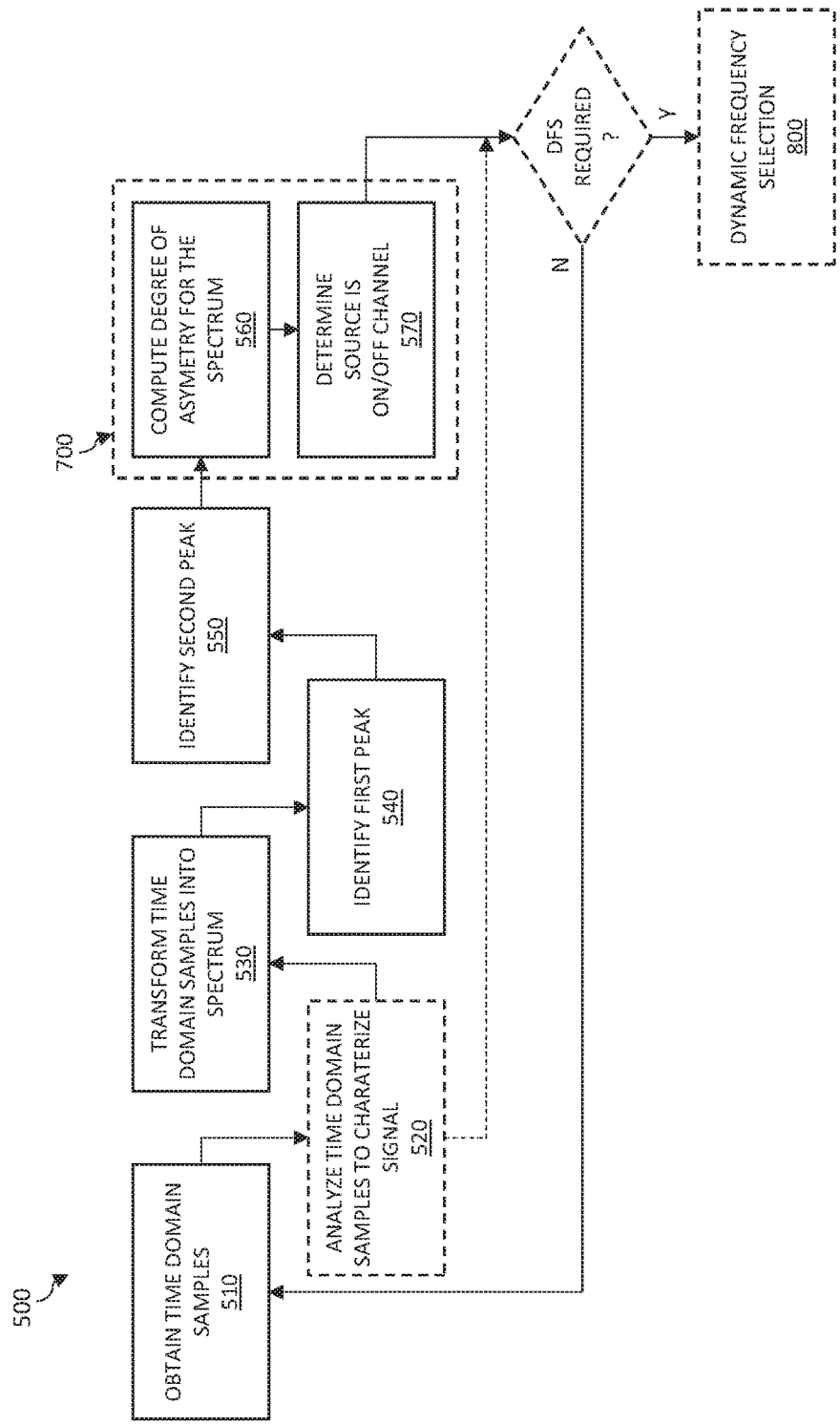
FIG. 5 is a flow diagram of a method for determining if a received signal is from a source that is operating on-channel or off-channel according to an embodiment of the present disclosure.

FIG. 5 is a flow diagram of an exemplary method for determining if a received signal is from a source that is operating on-channel or off-channel. In the method, time-domain samples of a received signal are obtained 510. Obtaining the time domain samples is typically performed using a WLAN apparatus.

Figure 6:
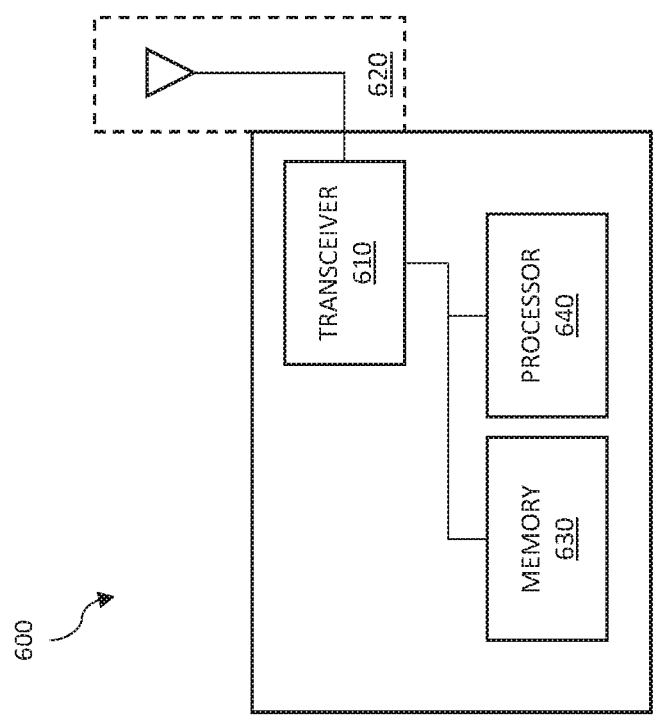
FIG. 6 graphically depicts a block diagram of a WLAN apparatus according to an embodiment of the present disclosure.

FIG. 6 is a block diagram of an exemplary WLAN apparatus 600. The WLAN apparatus 600 (e.g., gateway, router, repeater, switch, etc.) includes an antenna 620 tuned to an RF band. The antenna 620 may include a receiving/radiating element or elements (e.g., elements for beamforming, selection, etc.) that may be integrated with the WLAN apparatus or attached remotely to the WLAN apparatus by a waveguide (e.g., coaxial cable). The antenna 620 may also include amplification (e.g., cable loss compensation) and circuitry (e.g., impedance matching circuits, harmonic filters, couplers, baluns, power combiners dividers, etc.) to improve the antenna's receiving/transmitting performance (e.g., radiation efficiency, signal routing, and/or electromagnetic interference).

The WLAN apparatus 600 also includes a transceiver 610 connected to the antenna subsystem. The transceiver includes the electronics (e.g., RF amplifier, local oscillator, in-phase/quadrature (I/Q) mixer, IF amplifier, IF filter, demodulator, baseband amplifier, ADC, DAC, etc.) to configure the transceiver to transmit/receive on any one of a plurality of channels in the RF band. In practice, the transceiver may receive RF signals from the antenna 620 and down convert the RF signals to a baseband service channel. The down converted baseband signal may then be digitized by an analog to digital converter (ADC) and demodulated to produce time-domain samples. In practice, the signals typically received by WLAN apparatus correspond to digital communication packets exchanged between the WLAN apparatus 600 and one or more client devices 102a-d. The received signals described herein (see FIGS. 3A-C, 4A-B), however, correspond to a sequence of pulses (i.e., pulse trains) from a radar, with which the WLAN apparatus must avoid interfering.

The WLAN apparatus 600 also includes a processor 640 (e.g., CPU, multi-core processor, ARM, ASIC, FPGA, etc.) communicatively coupled (e.g., via traces, system on a chip, waveguide, cable, etc.) to the transceiver 610. As used herein, processor refers to a physical hardware device that executes computer readable instructions (software, firmware, etc.) to perform operations of a method. The computer readable instructions may be stored in a non-transitory computer readable medium 630 (i.e., memory) that is communicatively coupled to the processor.

Returning to FIG. 5, after the time domain samples of the received signal are obtained 510, they may be analyzed 520 directly (i.e., in time-domain) to characterize the signal. The analysis may include estimating the frequency, pulse width, and/or pulse repetition rate. In some cases, this analysis provides enough information to determine that the signal is a radar and in these cases, DFS may be triggered. In other cases, this analysis does not provide enough information to determine that the signal is a radar. This may result from an incomplete characterization of the signal or a requirement for other information to strengthen the confidence of the determination. To obtain additional information, the time domain samples are transformed 530 into a spectrum. The transformation may include computing a discrete Fourier transform (e.g., using a fast Fourier transform algorithm). The resulting spectrum may include bins that correspond to a frequency and that each have an amplitude representing the strength of that frequency in the signal. As describe above, a first and second peak may be identified 540, 550 in the spectrum. Then, based on the amplitudes of the first/second peak a degree of asymmetry for the spectrum may be computed 560 and used to determine 570 if the source of the signal is operating on channel or off channel.

Figure 7:
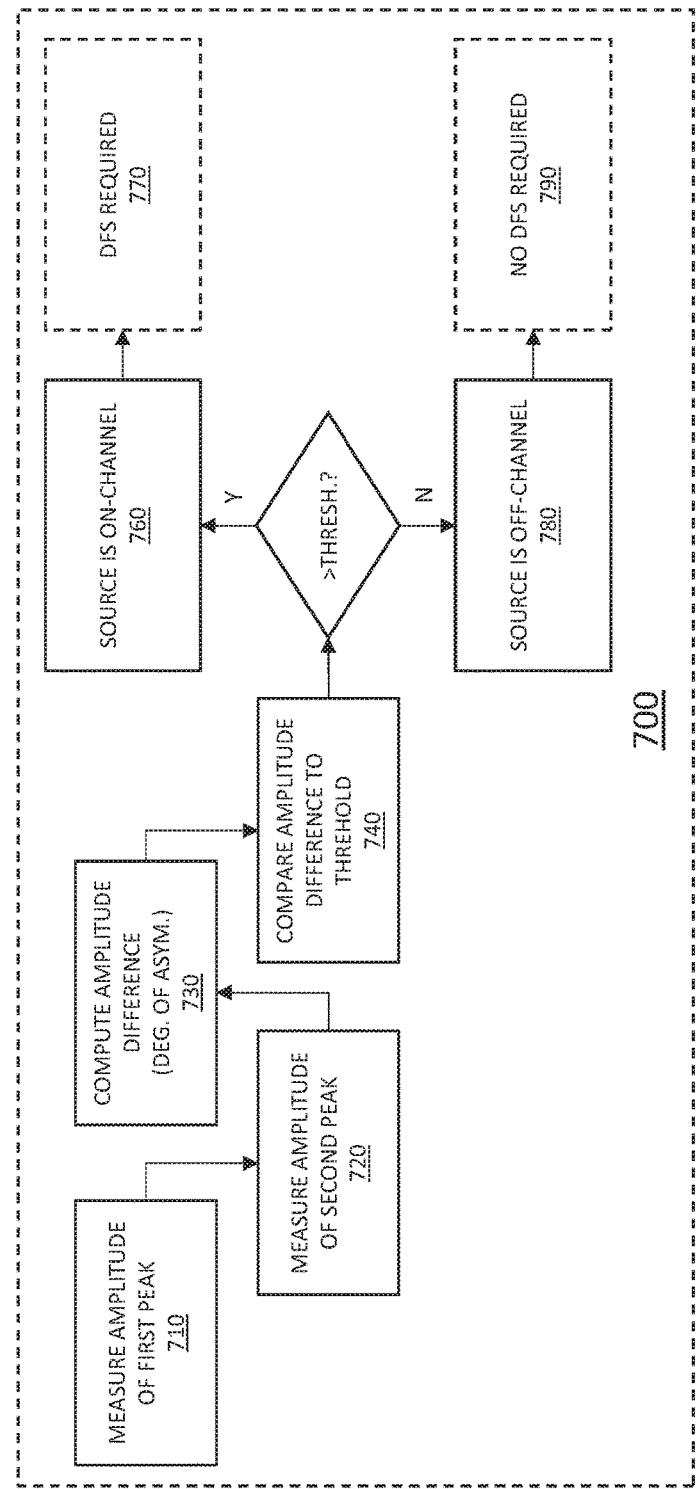
FIG. 7 is a flow diagram detailing a portion of the method, shown in FIG. 5, for determining that a source is on/off channel according to an embodiment of the present disclosure.

The details of exemplary method 700 for computing a spectrum's degree of asymmetry and determining that the source is on or off channel are shown in FIG. 7. The amplitudes of a first peak and a second peak are measured 710, 720. As described previously, the first peak may be found at a first frequency that is in either the positive or negative portion of the spectrum. The first frequency may be identified in a variety of ways including (but not limited to) finding the frequency corresponding to the highest peak of the spectrum, finding the frequency corresponding to the estimated frequency of the time domain signal, or as a defined parameter based on an expectation of a radar's signal characteristics. As described previously, the second frequency may be identified as the inverse (sign) of the first frequency or as a peak located in the range of frequencies around the inverse of the first frequency. The amplitude difference of the first/second frequencies may be computed as the degree of asymmetry for the spectrum 730. The degree of asymmetry may then be compared to a threshold 740. The threshold may be a predetermined threshold. The threshold value may be adjustable and/or based on previously measured on/off channel signals.

If the degree of asymmetry exceeds the threshold (i.e., spectrum appears asymmetric), then it may be concluded that the signal was transmitted from a source (e.g., radar or transmitter emitting a radar-like signal) operating on the same channel on which the WLAN apparatus is operating 760. Conversely, if the degree of asymmetry does not exceed the threshold (i.e., the spectrum appears symmetric), then it may be concluded that the signal was transmitted from a source (e.g., radar or transmitter emitting a radar-like signal) operating on a different channel from which the WLAN is operating 780.

The on/off channel determination may, in some cases, be used to determine if DFS is required 770 or is not required 790. If DFS is required, then the WLAN apparatus may be triggered to perform DFS 800. In some embodiments the on/off channel determination is used with other information (e.g., a time domain characterization of the signal) to make a final DFS determination. DFS includes tuning the WLAN apparatus to a new channel, which is different from the channel in the RF band, and establishing communications with client devices on the new channel.

The method 500 may be repeated for each received signal or may be triggered by the WLAN apparatus's inability to recognize the received signal as a proper communication packet. For example, a preliminary step of characterizing the time domain signal may be performed. If the time domain signal has the characteristics of a radar (e.g., is a sequence of pulses that meets a similarity requirement for a radar), then the method 500 may be applied to the signal.

The use of the term "and/or" in the present disclosure includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method comprising:
obtaining time-domain samples of a radio frequency (RF) signal that was received on a channel in an RF band, down converted to baseband, and demodulated;
transforming the time-domain samples into a spectrum centered at a zero frequency and having a positive portion and a negative portion;
identifying a first peak at a first peak frequency located in either the positive portion or negative portion of the spectrum;
identifying a second peak at a second peak frequency located in the portion of the spectrum not occupied by the first peak frequency, wherein the first and second peak frequencies are symmetric about the zero frequency;
computing, based on the first peak and the second peak, a degree of asymmetry for the spectrum;
determining, based on the degree of asymmetry, that a source of the RF signal is on-channel or off-channel; and
performing dynamic frequency selection (DFS) after determining that the source is on-channel.

2. The method according to claim 1, wherein the obtaining time-domain samples of a radio frequency (RF) signal that was received on a channel in an RF band, down converted to baseband, and demodulated is performed using a wireless local area network (WLAN) apparatus.

3. The method according to claim 2, wherein the source of the RF signal is a radar.

4. The method according to claim 3, wherein the RF band is shared by the WLAN apparatus and the radar.

5. The method according to claim 4, further comprising:
tuning the WLAN apparatus to a new channel, which is different from the channel in the RF band, after determining that the radar is on-channel.

6. The method according to claim 1, wherein the computing, based on the first peak and the second peak, a degree of asymmetry for the spectrum, comprises:
measuring a first amplitude of the first peak;
measuring a second amplitude of the second peak;
computing the degree of asymmetry as a difference between the first amplitude and the second amplitude.

7. The method according to claim 6, wherein the determining, based on the degree of asymmetry, that a source of the RF signal is on-channel or off-channel, comprises:
comparing the degree of asymmetry to a threshold; and
determining that the source is on-channel if the degree of asymmetry exceeds the threshold, otherwise determining that the source is off-channel.

8. The method according to claim 7, wherein the threshold is in the range of 10 to 20 decibels (dB).

9. The method according to claim 1, further comprising:
analyzing the time-domain samples before transforming the time-domain samples into a spectrum to obtain an estimated frequency; and
using the estimated frequency as the first peak frequency.

10. The method according to claim 1, wherein the transforming the time-domain samples into a spectrum comprises computing a discrete Fourier transform (DFT) of the time-domain samples.

11. The method according to claim 1, wherein the RF band is the unlicensed national information infrastructure (UNIT) band.

12. A wireless local area network (WLAN) apparatus comprising:
an antenna tuned to a radio frequency (RF) band;
a transceiver connected to the antenna and receiving, down converting, demodulating, and digitizing an RF signal from a channel in the RF band;
a processor communicatively coupled to the transceiver, wherein the processor is configured by software instructions to:
obtain time-domain samples of the received, down converted, demodulated, and digitized RF signal;
transform the time-domain samples into a spectrum centered at a zero frequency and having a positive portion and a negative portion;
identify a first peak at a first peak frequency located in either the positive portion or negative portion of the spectrum;
identify a second peak at a second peak frequency located in the portion of the spectrum not occupied by the first peak frequency, wherein the first and second peak frequencies are symmetric about the zero frequency;
compute, based on the first peak and the second peak, a degree of asymmetry for the spectrum;
determine, based on the degree of asymmetry, that a source of the RF signal is on-channel or off-channel; and
perform dynamic frequency selection (DFS) after determining that the source is on-channel.

13. The WLAN apparatus according to claim 12, wherein to compute, based on the first peak and the second peak, a degree of asymmetry for the spectrum, the processor is further configured to:
measure a first amplitude of the first peak;
measure a second amplitude of the second peak;
compute the degree of asymmetry as a difference between the first amplitude and the second amplitude.

14. The WLAN apparatus according to claim 13, wherein to determine, based on the degree of asymmetry, that a source of the RF signal is on-channel or off-channel, the processor is further configured to:
compare the degree of asymmetry to a threshold; and
determine that the source is on-channel if the degree of asymmetry exceeds the threshold, otherwise determining that the source is off-channel.

15. The WLAN apparatus according to claim 12, wherein the processor is further configured to:
analyze the time-domain samples before transforming the time-domain samples into a spectrum to obtain an estimated frequency; and
use the estimated frequency as the first peak frequency.

16. The WLAN apparatus according to claim 12, wherein to transform the time-domain samples into a spectrum the processor is configured to compute a discrete Fourier transform (DFT) of the time-domain samples.

17. The WLAN apparatus according to claim 12, wherein the RF band is the unlicensed national information infrastructure (UNIT) band.

18. A non-transitory computer readable medium containing computer readable instructions that when executed by a processor cause the processor to perform a method comprising:
obtaining time-domain samples of a radio frequency (RF) signal that was received on a channel in an RF band, down converted to baseband, and demodulated;
transforming the time-domain samples into a spectrum centered at a zero frequency and having a positive portion and a negative portion;
identifying a first peak at a first peak frequency located in either the positive portion or negative portion of the spectrum;
identifying a second peak at a second peak frequency located in the portion of the spectrum not occupied by the first peak frequency, wherein the first and second peak frequencies are symmetric about the zero frequency;
computing, based on the first peak and the second peak, a degree of asymmetry for the spectrum;
determining, based on the degree of asymmetry, that a source of the RF signal is on-channel or off-channel; and
performing dynamic frequency selection (DFS) after determining that the source is on-channel.

* * * * *